US009228458B2

(12) United States Patent
Reinhart et al.

(10) Patent No.: US 9,228,458 B2
(45) Date of Patent: Jan. 5, 2016

(54) VALVE SEAT INSERT

(75) Inventors: Paul T. Reinhart, Livonia, MI (US);
Ken Steven Fedeson, Farmington Hills, MI (US); Robert Stephen Furby, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1112 days.

(21) Appl. No.: 12/709,327

(22) Filed: Feb. 19, 2010

(65) Prior Publication Data

US 2011/0203555 A1   Aug. 25, 2011

(51) Int. Cl.
| | |
|---|---|
| *F02B 51/00* | (2006.01) |
| *F01L 3/04* | (2006.01) |
| *F01L 3/22* | (2006.01) |
| *F02D 41/30* | (2006.01) |
| *F16K 1/42* | (2006.01) |
| *F16K 25/00* | (2006.01) |
| *F16K 25/04* | (2006.01) |
| *F02D 41/00* | (2006.01) |

(52) U.S. Cl.
CPC ... *F01L 3/04* (2013.01); *F01L 3/22* (2013.01); *F02D 41/3005* (2013.01); *F16K 1/42* (2013.01); *F16K 25/005* (2013.01); *F16K 25/04* (2013.01); *F02D 41/0025* (2013.01)

(58) Field of Classification Search
USPC ............. 123/188.8, 193.5, 536, 41.85, 41.76, 123/188.2, 90.48; 251/129.01, 129.15, 152, 251/359–365, 368, 369; 29/888.4, 888.44, 29/890.122; 137/234.5, 246.2, 247.17, 137/283, 315.31, 515.5, 516.25
See application file for complete search history.

(56) References Cited

U.S. PATENT DOCUMENTS

| | | | |
|---|---|---|---|
| 2,178,895 A | 3/1939 | Myers | |
| 4,723,518 A | 2/1988 | Kawasaki et al. | |
| 5,586,530 A | 12/1996 | Adachi et al. | |
| 5,809,968 A | 9/1998 | Tsuchida | |
| 6,260,531 B1 * | 7/2001 | Haan et al. | 123/188.8 |
| 6,298,817 B1 | 10/2001 | Hoeg | |
| 6,536,397 B2 * | 3/2003 | Mizutani | 123/188.8 |
| 7,121,907 B2 * | 10/2006 | Tateishi et al. | 440/88 R |
| 2005/0034700 A1 | 2/2005 | Clause et al. | |
| 2006/0162686 A1 | 7/2006 | Heigl | |
| 2008/0072948 A1 * | 3/2008 | McGilvray et al. | 136/230 |

* cited by examiner

*Primary Examiner* — Hung Q Nguyen
*Assistant Examiner* — Ruben Picon-Feliciano
(74) *Attorney, Agent, or Firm* — Julia Voutyras; Alleman Hall McCoy Russell & Tuttle LLP

(57) ABSTRACT

In one example, a valve seat insert for a cylinder head seat pocket of an internal combustion engine is described. The valve seat insert comprises an annular body comprising a first material and including an inner surface, an outer surface opposite the inner surface, a front surface adjoining the inner and outer surfaces, and a back surface opposite the front surface adjoining the inner and outer surfaces. The front surface includes an inner circumference greater than an inner circumference of the back surface. The back surface includes a first recession inlaid with a sacrificial anode comprising a second material different from the first material and having an exposed surface. In this manner, it may be possible to substantially prevent corrosion of the cylinder head seat pocket.

20 Claims, 6 Drawing Sheets

VALVE SEAT INSERT

FIELD

The present application relates to a valve seat insert of an internal combustion engine that may provide increased resistance against corrosion when used with electrically conductive fuels such as fuels containing increased concentrations of ethanol.

BACKGROUND AND SUMMARY

A poppet valve may be used in an internal combustion engine to control the flow of a fuel/air mixture from a fuel intake port of a cylinder head into a combustion chamber of the engine. The poppet valve circumferentially seals the valve face and a valve seat. When the valve is closed, the valve face is pressed tightly against the valve seat insert and the fuel/air mixture is blocked by the valve. When the valve is open, the valve face is disengaged from the valve seat and the fuel/air mixture may flow through the valve.

In a cast iron cylinder head, the valve seat may be integral to the cylinder head, but in an aluminum or aluminum alloy cylinder head, the valve seat insert may be inserted into a cylinder head seat pocket. A valve seat insert may be made of a sintered metal alloy which is harder and more wear resistant than aluminum. The valve seat insert is typically press-fitted into the cylinder head seat pocket and a small gap may remain between the valve seat insert and the back of the cylinder head seat pocket.

During engine operation, fuel may migrate into the small gap. The fuel in the gap is generally benign when used with conventional fuel mixtures containing about 90% gasoline and 10% ethanol. However, the fuel in the gap may be more problematic when the fuel contains high percentages of ethanol, such as the E85 blend which contains 85% ethanol and 15% gasoline. Specifically, high concentrations of ethanol in the gap may enable the aluminum cylinder head seat pocket to corrode. Excessive corrosion of the cylinder head seat pocket may enable the valve seat insert to shift over time such that the valve no longer fully closes causing a loss of compression and possible overheating and damage to the valve.

The inventors herein have recognized that one source of corrosion may be a galvanic reaction as the electrically conductive ethanol acts as an electrolyte to transport ions from the aluminum cylinder head seat pocket to the valve seat insert. The valve seat insert acts as a cathode and the aluminum cylinder head seat pocket acts as an anode in the reaction. As ions are conducted from the anode, the anode material corrodes and the cathode material remains substantially free of corrosion.

One approach to address the above issues includes a valve seat insert for a cylinder head seat pocket of an internal combustion engine. The valve seat insert comprises an annular body comprising a first material and including an inner surface, an outer surface opposite the inner surface, a front surface adjoining the inner and outer surfaces, and a back surface opposite the front surface adjoining the inner and outer surfaces. The front surface includes an inner circumference greater than an inner circumference of the back surface. The back surface includes a first recession. A sacrificial anode comprising a second material different from the first material and including an exposed surface may be inlaid in the first recession of the back surface of the annular body. In this manner, the sacrificial anode may be preferentially corroded instead of the aluminum cylinder head.

Furthermore, a complementary approach to address the above issues includes a method for delivering fuel in an engine. The engine may include a cylinder head including a valve seat insert including a sacrificial anode facing the cylinder head. The method comprises inducting injected electrically conductive fuel past the valve seat insert and conducting ions from the sacrificial anode via a galvanic reaction. In this way, it may be possible to substantially reduce corrosion of the cylinder head seat pocket.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-14 are drawn approximately to scale, although various modifications may be made, if desired.

DETAILED DESCRIPTION

Figure 12:
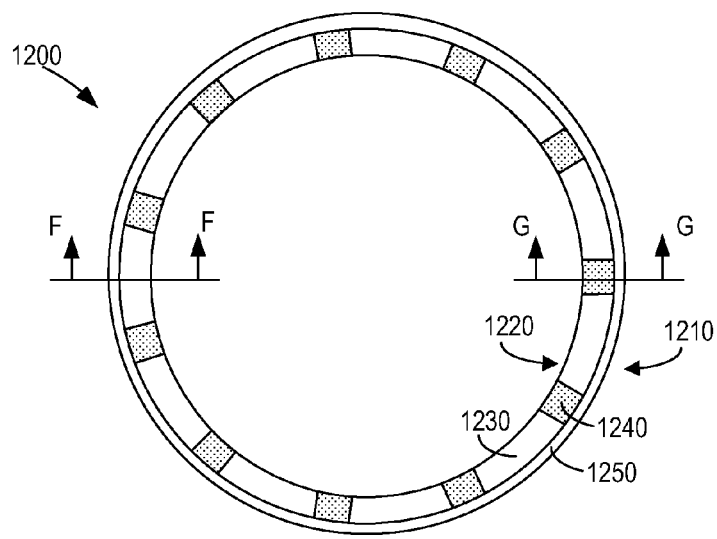
FIGS. 12-14 show views of a valve seat insert having a sacrificial anode used in combination with channels in a back of the valve seat insert.
Figures 13, 14:
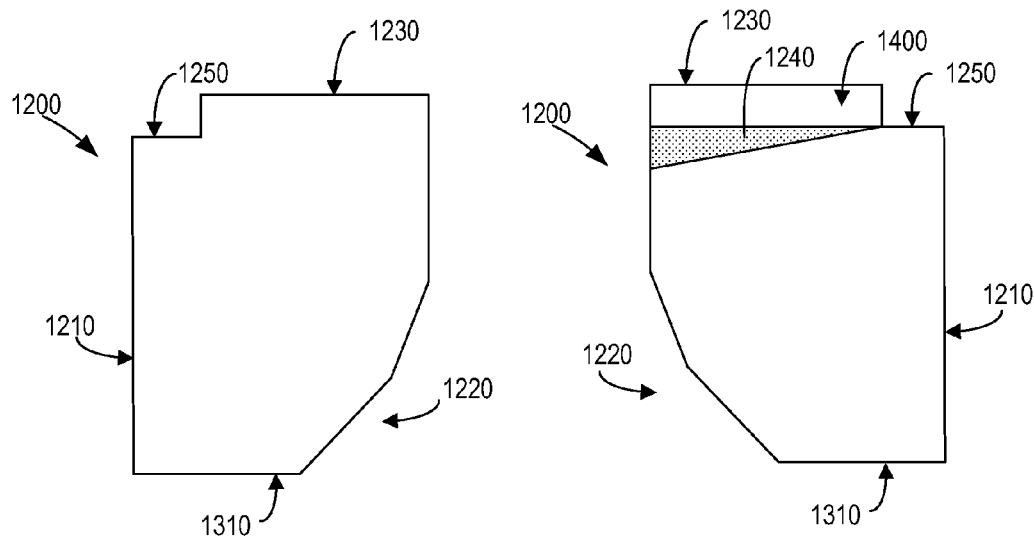

The following description relates to systems and methods for a valve seat insert of an internal combustion engine that may resist corrosion when used with electrically conductive fuels such as fuels containing high concentrations of ethanol. For example, the engine (such as the one illustrated in FIG. 1) may include a valve seat insert having a sacrificial anode as illustrated in FIGS. 2A-5. The valve seat fits into a seat pocket of a cylinder head of the engine as shown in FIG. 3. FIG. 3 also shows how fuel may get trapped in a gap between the cylinder head and the valve seat insert. A galvanic cell may be created when the trapped, conductive fuel acts an electrolyte conducting ions between the differing metals of the cylinder head and the valve seat insert. The sacrificial anode may enable the cylinder head seat pocket to resist corrosion. FIGS. 6-11 show an alternate embodiment of a valve seat insert having a sacrificial anode inlaid in a back of the valve seat insert. FIGS. 12-14 show an alternate embodiment of a valve seat insert having a sacrificial anode used in combination with channels in a back of the valve seat insert. Finally, an example method for delivering electrically conductive fuel in an engine is illustrated by the high level flowchart in FIG. 15.

Figure 1:
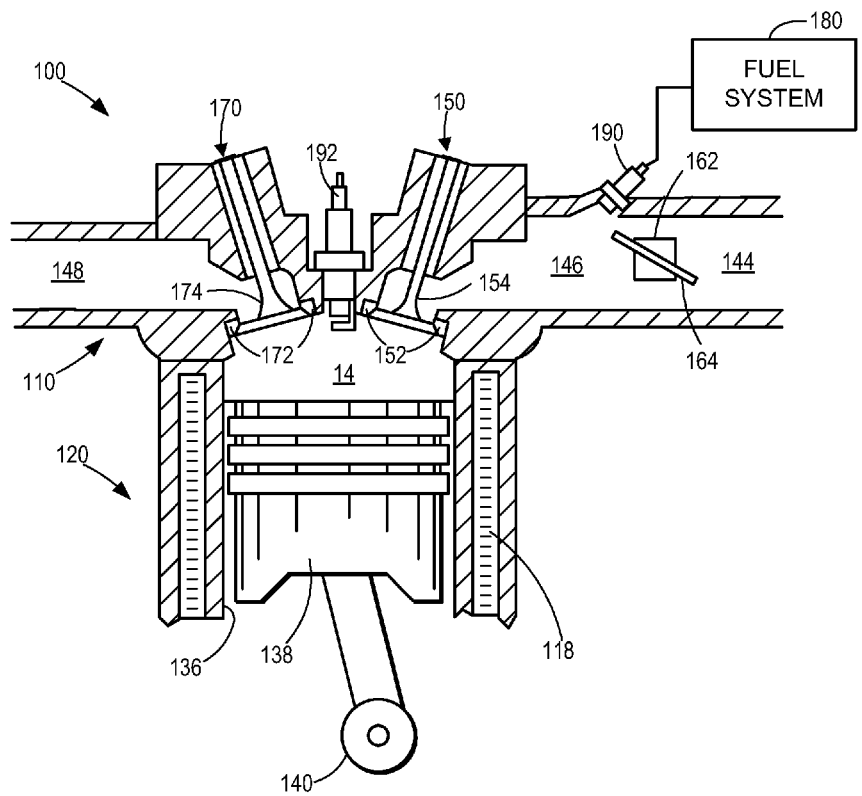
FIG. 1 depicts an example embodiment of one cylinder of an internal combustion engine in a system for a vehicle.

FIG. 1 depicts an example embodiment of a combustion chamber or cylinder of internal combustion engine 100. Engine 100 includes cylinder head 110 and engine block 120 which are coupled to form cylindrical combustion chamber (cylinder) 14. Cylinder head 110 and engine block 120 may each be constructed out of aluminum or an aluminum alloy. Cylinder 14 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 100.

Cylinder 14 can receive intake air via a series of intake air passages 144 and 146. Intake air passage 146 can communicate with other cylinders of engine 100 in addition to cylinder 14. In some embodiments, one or more of the intake passages may include a boosting device such as a turbocharger or a supercharger. A throttle 162 including a throttle plate 164 may be provided along an intake passage of the engine for varying the flow rate and/or pressure of intake air provided to the engine cylinders. Exhaust passage 148 can receive exhaust gases from other cylinders of engine 100 in addition to cylinder 14.

In some embodiments, each cylinder of engine 100 may be configured with one or more fuel injectors for providing fuel thereto. As a non-limiting example, cylinder 14 is shown including a single fuel injector 190 receiving liquid fuel from a single fuel delivery system 180. Fuel injector 190 is shown arranged in intake passage 146 in a configuration that provides what is known as port injection of fuel (PFI) into the intake port upstream of cylinder 14. Fuel injector 190 may inject fuel in proportion to a pulse width of a signal received from a controller. Fuel injector 190 may inject fuel through a small nozzle at high pressure, thus atomizing the fuel and creating an air/fuel mixture in intake air passage 146. As non-limiting examples, the liquid fuel may be gasoline, ethanol, or combinations thereof.

Each cylinder of engine 100 may include one or more intake valves and one or more exhaust valves. For example, cylinder 14 is shown including at least one intake poppet valve 150 and at least one exhaust poppet valve 170 located at an upper region of cylinder 14. In some embodiments, each cylinder of engine 100, including cylinder 14, may include at least two intake poppet valves and at least two exhaust poppet valves located at an upper region of the cylinder. In some embodiments, each cylinder of engine 100 may include a spark plug 192 for initiating combustion.

Poppet valve 150 includes valve face 154 and valve seat insert 152. Poppet valve 170 includes valve stem 174 and valve seat insert 172. Poppet valve 150 is closed when valve face 154 abuts valve seat insert 152. Poppet valve 150 is open when valve face 154 is actuated away from valve seat insert 152, such as by an overhead cam, for example. Poppet valve 170 works similarly. Cylinder 14 may be filled with the air/fuel mixture by closing poppet valve 170, opening poppet valve 150, and inducting the air/fuel mixture from intake air passage 146 past valve seat insert 152 via actuation of piston 138. Poppet valves 150 and 170 are closed during the compression, combustion, and expansion phases so that force may be applied to piston 138. Poppet valve 150 is closed and poppet valve 170 is opened to expel exhaust gasses from cylinder 14 into exhaust passage 148 in preparation for the next cycle.

Poppet valves 150 and 170 are exposed to the forces of combustion and the wear of opening and closing many times per second during engine operation. As such, valve seat inserts 152 and 172 may be constructed of a durable, wear-resistant material, such as a sintered or cast metal alloy which may include iron. Valve seat inserts 152 and 172 may be press-fitted into a seat pocket of cylinder head 110. A small gap may remain between each of the valve seat inserts 152 and 172 and the back of the seat pocket of cylinder head 110. During engine operation, fuel from the air/fuel mixture in intake air passage 146 may migrate into the small gap between valve seat insert 152 and cylinder head 110.

The fuel in the gap is generally benign when used with dielectric fuel mixtures containing about 90% gasoline and 10% ethanol. However, the fuel in the gap may be more problematic when the fuel is electrically conductive, such as when the fuel contains higher percentages of ethanol, such as greater than 50% ethanol. One non-limiting example of electrically conductive fuel is the E85 blend which contains 85% ethanol and 15% gasoline. Electrically conductive fuel trapped in the small gap between valve seat insert 152 and cylinder head 110 may enable a conventional aluminum cylinder head seat pocket to corrode. Excessive corrosion of the cylinder head seat pocket may enable valve seat insert 152 to shift axially over time such that poppet valve 150 no longer operates correctly. For example, axial movement of valve seat insert 152 due to corrosion of cylinder head 110 may create reduced clearance on mechanical valve-train system(s) which may cause a loss of compression in cylinder 14 and may cause damage to poppet valve 150 due to temperatures in intake air passage 146 exceeding design parameters.

As described above, FIG. 1 shows only one cylinder of a multi-cylinder engine. As such, each cylinder may similarly include its own set of intake/exhaust valves, fuel injector(s), spark plug, etc.

One source of corrosion of the cylinder head seat pocket may be a galvanic reaction. A galvanic reaction may occur when dissimilar metals are in contact with an electrically conductive electrolyte. A non-limiting example of an electrolyte is fuel containing higher concentrations of ethanol, such as E85. The electrolyte may transport ions from one metal, the anode, to the other metal, the cathode. The anode is oxidized and the cathode is reduced during the reaction. The anode and the cathode are determined by the relative nobility of each metal as given by a galvanic series for a given electrolyte. A more noble metal is less likely to oxidize, and will form a cathode, when placed in an electrolyte with a less noble metal, which forms an anode. For example, the galvanic series for metals common to many engine components in an ethanol electrolyte, from most noble to least noble, may be cast iron, steel, aluminum, zinc, and magnesium respectively. Thus, a cast iron valve seat insert may act as a cathode and an aluminum cylinder head may act as an anode in a galvanic reaction.

During a galvanic reaction, the anode may corrode as ions are conducted from the anode to the cathode. However, the cathode may remain substantially free of corrosion. The amount of corrosion of the anode may depend on the amount and concentration of electrolyte, the area of the anode relative to the cathode, and the difference in electrode potential between the anode and the cathode, e.g. the distance between metals in the galvanic series. Each of these corrosion factors may be addressed in the design of a valve seat insert.

The materials for cylinder head 110 and valve seat insert 152 may be selected for desirable properties of the materials related to engine design. For example, aluminum is lightweight, easy to form, and a good heat conductor, making it a good material for engine block 120 and cylinder head 110. Cast iron and sintered iron are very durable, making them good candidates for components that receive excessive wear, such as valve seat insert 152. However, aluminum cylinder head 110 may corrode when it is the anode of a galvanic reaction in ethanol and valve seat insert 152 is the cathode. Adding a sacrificial anode that corrodes preferentially to aluminum cylinder head 110 may substantially reduce corrosion of aluminum cylinder head 110. For example, a sacrificial anode may be added that is constructed of zinc or magnesium, which may be more reactive than aluminum when in contact with an electrolyte of ethanol fuel.

Figures 2A, 2B:
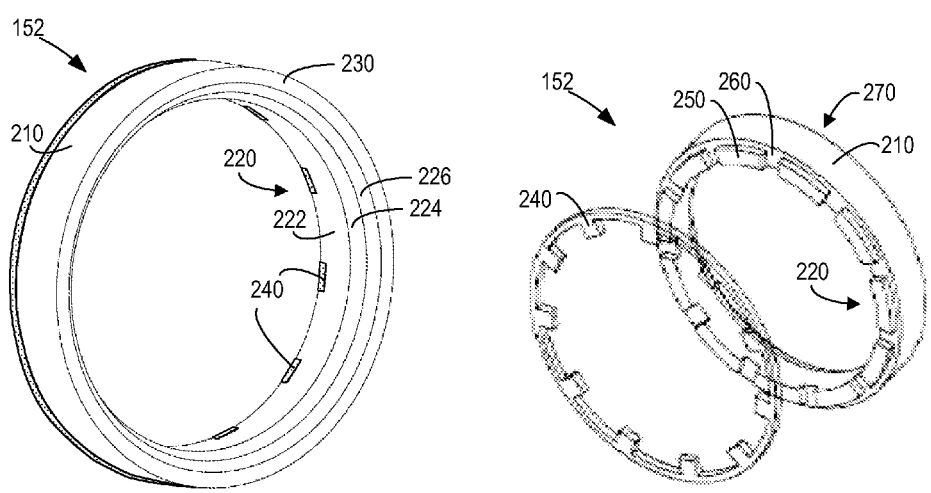
FIGS. 2A and 2B show two isometric views of a valve seat insert having a sacrificial anode.
Figure 3:
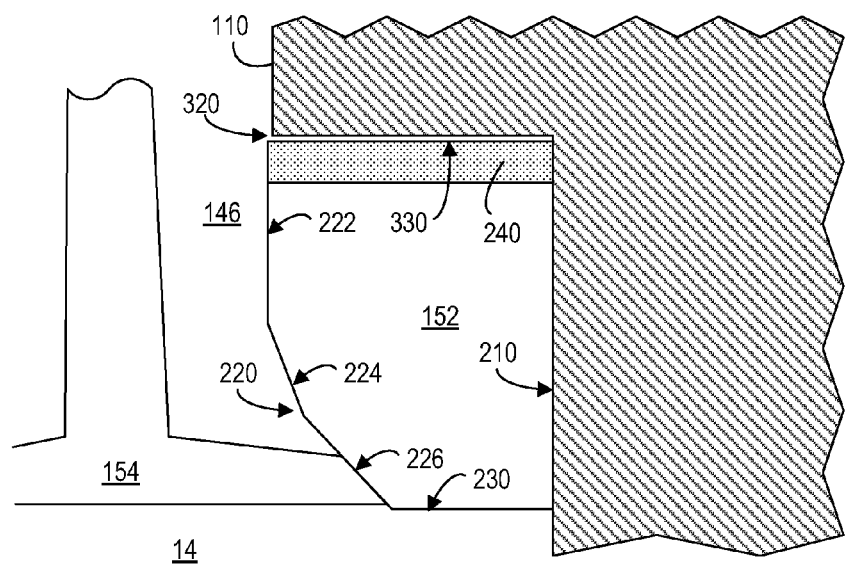
FIG. 3 shows a sectional view of a valve seat insert fitted into a seat pocket of a cylinder head of an engine.

FIG. 2A illustrates an isometric view of valve seat insert 152 having sacrificial anode 240. Valve seat insert 152 has an annular body comprising a first material. As a non-limiting example, the first material may include cast or sintered iron. Valve seat insert 152 comprises inner surface 220, outer surface 210 opposite inner surface 220, and front surface 230 adjoining inner surface 220 and outer surface 210. A back surface of valve seat insert 152 (not shown in FIG. 2A) is opposite the front surface adjoining inner surface 220 and outer surface 210. Inner surface 220 may further comprise axial face 222 and inclined faces 224 and 226. Axial face 222 adjoins the back surface and inclined face 224. Inclined face 224 adjoins axial face 222 and inclined face 226. Inclined face 226 adjoins inclined face 224 and front surface 230. Axial face 222 may be parallel to outer surface 210 and perpendicular to the back surface. In an alternative embodiment, inner surface 220 may include one or more inclined faces or a curved surface. One or more of inclined faces 224 and 226 may be oriented to abut with valve face 154 when poppet valve 150 is closed. Inclined faces 224 and 226 may cause front surface 230 to have an inner circumference greater than an inner circumference of the back surface.

FIG. 2B illustrates an exploded view of valve seat insert 152 showing sacrificial anode 240 and annular body 270. Annular body 270 includes back surface 250 and recession 260. In the example embodiment, recession 260 forms a castellated surface on annular body 270 where back surface 250 comprises the peaks of the castellations. Recession 260 may be a hollow or groove, such as an annular groove or slot, a plurality of radial grooves, or combinations thereof, for example. Sacrificial anode 240 may comprise a second material that is different from the first material of the annular body. For example, the second material may be less noble than the first material of the annular body in a galvanic series for ethanol. As non-limiting examples, the second material may include zinc, magnesium, alloys with zinc or magnesium, or combinations thereof. Sacrificial anode 240 may be inlaid in recession 260 and then sintered together with the body of the first material. In an alternative embodiment, sacrificial anode 240 may be inlaid in recession 260 by hot-dip galvanization or electroplating. In yet another embodiment, sacrificial anode 240 may be inlaid in recession 260 via a Damascene process. When sacrificial anode 240 is inlaid in recession 260, sacrificial anode 240 will have the same general shape as recession 260. Sacrificial anode 240 may have an exposed surface in electrical contact with the electrolyte during operation of engine 100.

FIG. 3 shows a sectional view of valve seat insert 152 fitted into a seat pocket of cylinder head 110 of engine 100. Poppet valve 150 is closed in this view with valve face 154 abutted against valve seat insert 152. Back surface 330 of valve seat insert 152 faces the back of the seat pocket. Back surface 330 includes the exposed surface of sacrificial anode 240 and back surface 250 of annular body 270. The exposed surface of sacrificial anode 240 may be flush with back surface 250 such that back surface 330 is planar. In an alternative embodiment, back surface 250 may be nearer the back of the seat pocket than the exposed surface of sacrificial anode 240 when valve seat insert 152 is fitted into the seat pocket of cylinder head 110.

Fuel from the air/fuel mixture in intake air passage 146 may migrate into small gap 320 formed between the back of the seat pocket and back surface 330 of valve seat insert 152. The fuel may act as an electrolyte in a galvanic reaction. When sacrificial anode 240 is in contact with the electrolyte, sacrificial anode 240 may be preferentially corroded instead of the seat pocket of cylinder head 110. The corrosion protection offered by sacrificial anode 240 may be determined in part by the ratio of a surface area of sacrificial anode 240 to a surface area of back surface 330 of valve seat insert 152. Increasing the surface area of sacrificial anode 240 may increase the corrosion protection for the seat pocket. However, the surface area of sacrificial anode 240 may be balanced against the surface area of back surface 250. Back surface 250 provides axial support for valve seat insert 152 when inserted into the seat pocket. In one embodiment, the surface area of sacrificial anode 240 may comprise approximately 50% of the surface area of back surface 330 with the surface area of back surface 250 comprising the other 50% of the surface area of back surface 330. Increasing the surface area of sacrificial anode 240 may increase the corrosion protection but decrease the axial support for valve seat insert 152. Decreasing the surface area of sacrificial anode 240 may decrease the corrosion protection but increase the axial support for valve seat insert 152. In one example, the surface area of back surface 250 may be greater than or equal to the surface area of the exposed surface of sacrificial anode 240 to maintain appropriate axial support.

Figure 4:
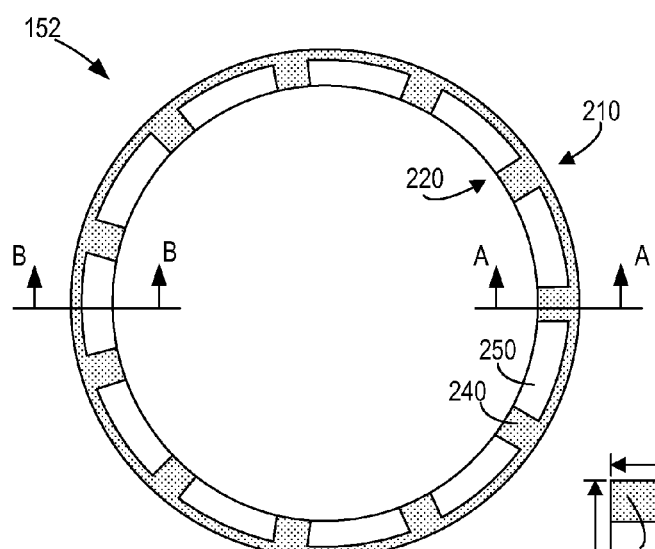
FIGS. 4 and 5 show views of the valve seat insert of FIGS. 2A and 2B.
Figure 5:
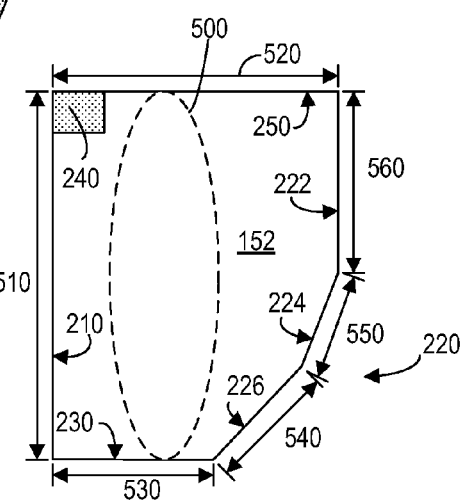

FIG. 4 shows a view of back surface 330 of valve seat insert 152 illustrating the surface area of sacrificial anode 240 relative to the surface area of back surface 330. Section A-A is the section illustrated in FIG. 3 and section B-B is the section illustrated in FIG. 5. FIG. 5 is a sectional view through a castellation of annular body 270 of valve seat insert 152. Section 500 shows a contiguous section of annular body 270 extending from front surface 230 to back surface 330. Section 500 may provide axial support for valve seat insert 152 as sacrificial anode 240 corrodes. In an alternative embodiment, back surface 330 may include a chamfer extending along outer surface 210 to enable valve seat insert 152 to be guided into the seat pocket of the cylinder head 110 during press-fitting.

In the example embodiment of FIGS. 2A-5, a diameter of outer surface 210 may be between one and 1.5 times larger than a diameter of axial face 222 of inner surface 220. Width 520 of back surface 250 may be between one third and one half of height 510 of outer surface 210. Width 530 of front surface 230 may be between one fourth and one sixth of height 510. Width 540 of inclined face 226 and width 550 of inclined face 224 may also be between one fourth and one sixth of height 510. Height 560 of axial face 222 may be between one third and two thirds of height 510. In alternative embodiments, other suitable geometries may be used.

Figure 6:
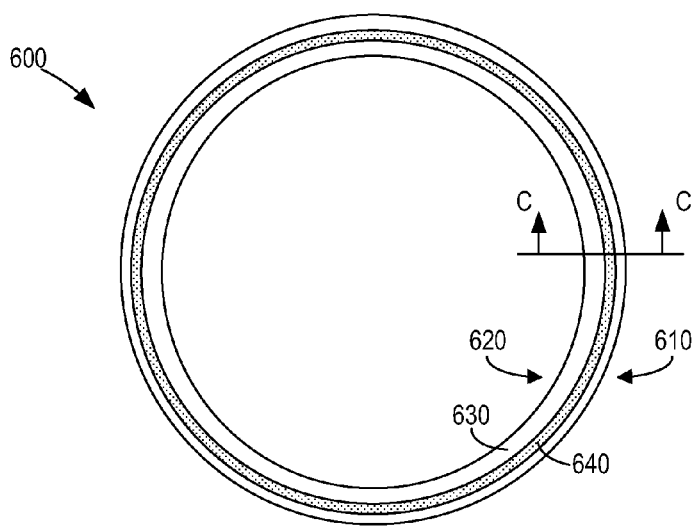
FIGS. 6-8 show views of a valve seat insert having a sacrificial anode inlaid in a circular groove in a back of the valve seat insert.
Figure 7:
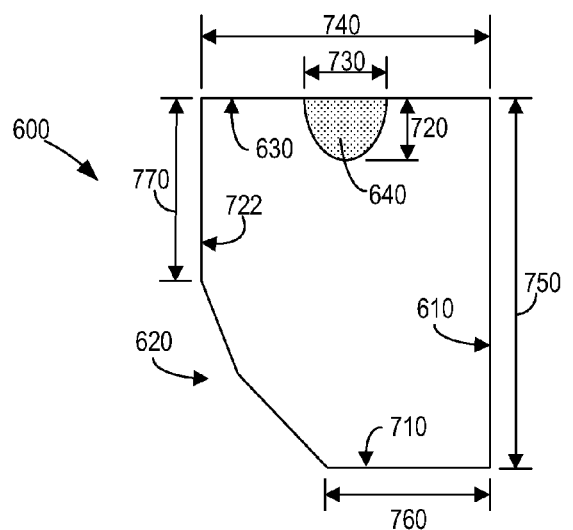
Figure 8:
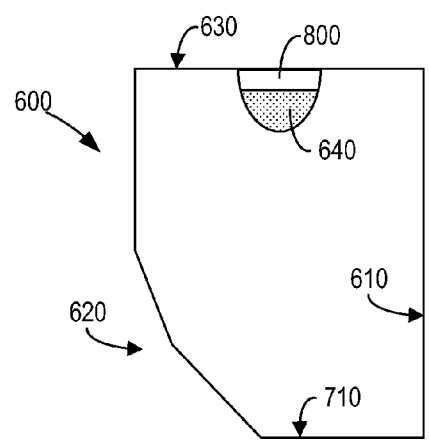

FIGS. 6-8 show views of an alternative embodiment of valve seat insert 600. FIG. 6 illustrates the back surface of valve seat insert 600. Valve seat insert 600 includes an annular body comprising a first material and having inner surface 620, outer surface 610, a front surface 710 adjoining inner surface 620 and outer surface 610. Further, valve seat insert 600 includes sacrificial anode 640 inlaid in a circular groove in back surface 630 of valve seat insert 600.

FIG. 7 shows an example embodiment of section cut C-C, where sacrificial anode 640 is flush with back surface 630. In this embodiment, the recession in back surface 630 is completely filled by sacrificial anode 640. The recession in back surface 630 includes width 730 and depth 720. In the example embodiment, depth 720 is less than twice width 730. Back surface 630 includes a width 740 which may be greater than or equal to three times width 730 of the recession. Outer surface 610 includes height 750 which may be less than three times width 740. Depth 720 may be less than one sixth of height 750. Front surface 710 includes width 760 which may be less than or equal to one half of width 740. Inner surface 620 includes axial surface 722 which may have a height 770 between one third and two thirds of height 750. Valve seat insert 600 is described as a non-limiting example and other geometric configurations may also be suitable.

FIG. 8 shows an alternate embodiment of section cut C-C, where sacrificial anode 640 is not flush with back surface 630. In this embodiment, recession 800 in back surface 630 is partially filled by sacrificial anode 640. A partially filled recession in back surface 630 may provide a channel for fuel and evaporated fuel vapors to flow. A circular groove in the back surface of a valve seat insert may be centered as in FIGS. 6-8, or one side of the circular groove may abut the inner surface or the outer surface of the valve seat insert.

Figure 9:
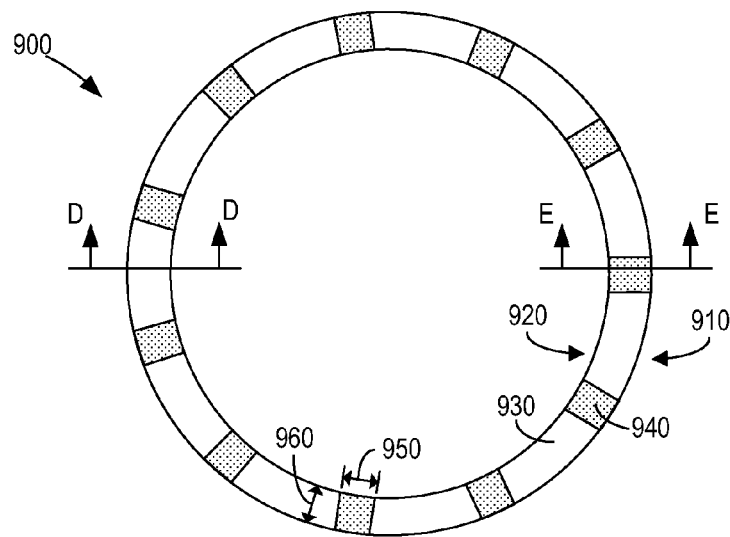
FIGS. 9-11 show views of a valve seat insert having a sacrificial anode inlaid in a plurality of radial grooves in a back of the valve seat insert.
Figures 10, 11:
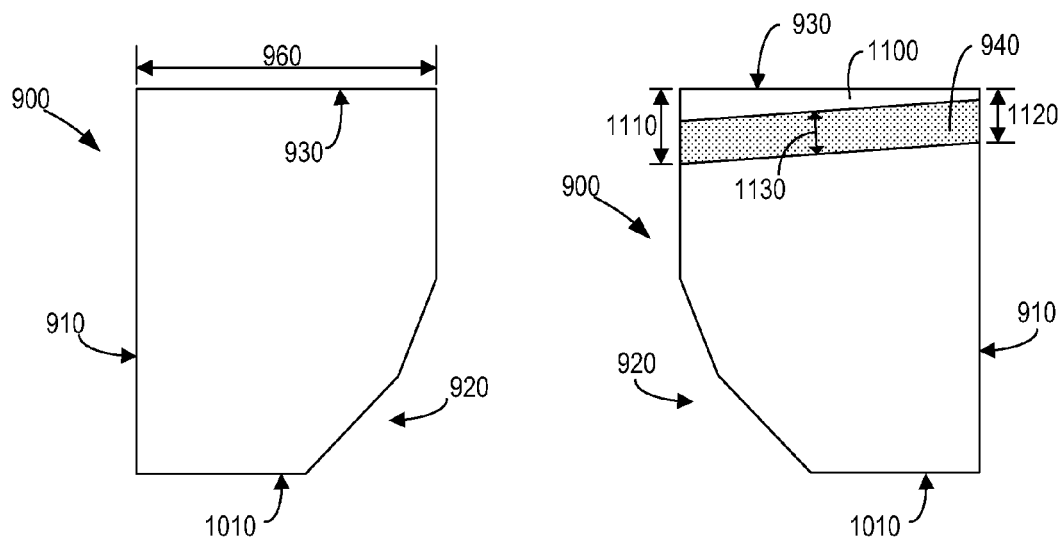

FIGS. 9-11 show views of an alternative embodiment of valve seat insert 900. FIG. 9 illustrates the back surface of valve seat insert 900. Valve seat insert 900 includes an annular body comprising a first material and having inner surface 920, outer surface 910, a front surface 1010 adjoining inner surface 920 and outer surface 910. Further, valve seat insert 900 includes sacrificial anode 940 inlaid in a plurality of radial grooves in back surface 930 of valve seat insert 900. Back surface 930 includes width 960 and each radial groove has width 950. In the example embodiment, width 960 is substantially equal to width 950. In alternative embodiments, width 950 may be less than twice width 960.

FIG. 10 shows section cut D-D of the example embodiment of FIG. 9. In this section, only the annular body of the first material may be seen. The contiguous section of the annular body may provide the axial support for valve seat insert 900 when it is fitted in the cylinder head seat pocket.

FIG. 11 shows section cut E-E of the example embodiment of FIG. 9. In this section, sacrificial anode 940 is shown inlaid in a radial groove in back surface 930. In this embodiment, sacrificial anode 940 is not flush with the back surface of the annular body, creating channel 1100. Channel 1100 may enable fuel and fuel vapor to migrate away from the cylinder head and back into intake air passage 146. Specifically, when the air/fuel mixture is inducted into cylinder 14 by the actuation of piston 138, the flow of the air/fuel mixture past channel 1100 may aid in the evaporation of fuel in channel 1100. Removing the fuel, e.g. the electrolyte, from the gap between the valve seat insert and the cylinder head may stop the galvanic reaction and its associated corrosion.

Sloping channel 1100 down and toward intake air passage 146 may also aid in the removal of fuel from channel 1100 as gravity draws the fuel back toward air passage 146. A sloping channel may be created when back surface 930 includes a recession with maximum depth 1110 greater than minimum depth 1120. Sacrificial anode 940 may have constant depth 1130 or the depth may vary in order to increase or decrease the slope provided by the recession in back surface 930. When the depth of the recession is equal to the depth of sacrificial anode 940, sacrificial anode 940 and back surface 930 of the annular body are flush. In the example embodiment of FIGS. 9-11, width 950 is approximately equal to width 960 and maximum depth 1110 is less than one half of width 960. In an alternative embodiment, width 950 is less than twice width 960 and maximum depth 1110 is less than width 960.

FIGS. 12-14 show views of an alternative embodiment of valve seat insert 1200. FIG. 12 illustrates the back surface of valve seat insert 1200. Valve seat insert 1200 includes an annular body comprising a first material and having inner surface 1220, outer surface 1210, a front surface 1310 adjoining inner surface 1220 and outer surface 1210. Further, valve seat insert 1200 includes outer radial slot 1250 and sacrificial anode 1240 inlaid in a plurality of radial grooves in back surface 1230.

FIG. 13 shows section cut F-F of the example embodiment of FIG. 12. In this section, only the annular body of the first material may be seen. Outer radial slot 1250 is a recession in back surface 1230 that may enable fuel to migrate into and out of the gap between the cylinder head and the valve seat insert. By keeping fuel flowing into and out of the gap, the fuel may avoid extended exposure at high temperatures in the gap which may reduce corrosion of the cylinder head. Outer radial slot 1250 is an example of a recession that may form a channel between the cylinder head and the valve seat insert. The channel may enable air to flow between the cylinder head and the valve seat insert aiding evaporation of trapped fuel. In the example embodiment, outer radial slot 1250 is not filled with sacrificial anode material. In alternative embodiments, outer radial slot 1250 may contain some sacrificial anode material.

FIG. 14 shows section cut G-G of the example embodiment of FIG. 12. In this section, sacrificial anode 1240 is shown inlaid in a radial groove in back surface 1230. In this embodiment, sacrificial anode 1240 is not flush with the back surface of the annular body, creating radial channel 1400. The combination of radial channel 1400 and outer radial slot 1250 may aid evaporation of fuel in the gap between the cylinder head and valve seat insert 1200. Removing fuel from the gap may reduce galvanic corrosion by removing the electrolyte that may enable a galvanic reaction.

Figure 15:
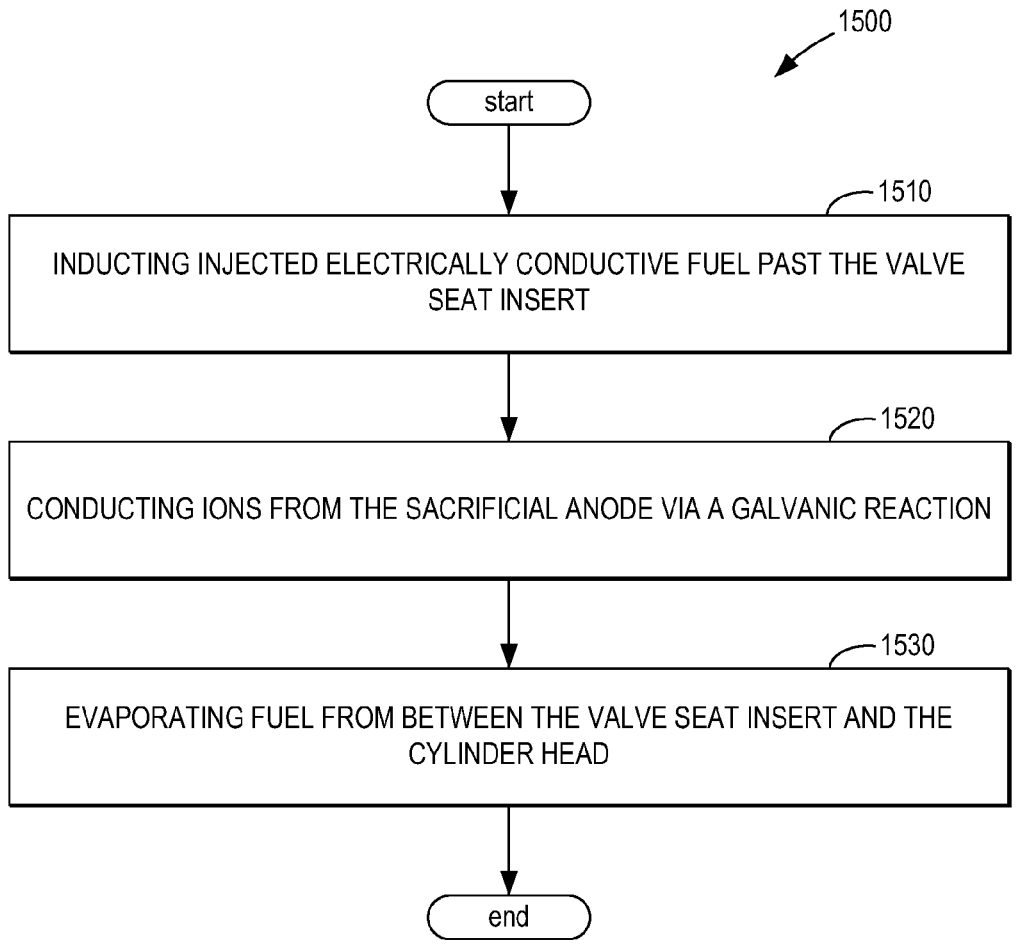
FIG. 15 shows a high level flowchart for a method for delivering fuel in an engine.

FIG. 15 illustrates a high-level flowchart for an example of a method for delivering fuel in engine 100. Engine 100 includes cylinder head 110 including valve seat insert 152 including sacrificial anode 240 facing cylinder head 110. Method 1500 begins at 1510, by inducting injected electrically conductive fuel past valve seat insert 152. The electrically conductive fuel may be E85, for example. The fuel may be atomized to form an air/fuel mixture in intake air passage 146. Some of the fuel from the air/fuel mixture may migrate into small gap 320 as the air/fuel mixture travels toward cylinder 14.

At 1520, ions are conducted from sacrificial anode 240 via a galvanic reaction using the electrically conductive fuel as an electrolyte. The galvanic reaction may occur when the dissimilar metals of cylinder head 110 and valve seat insert 152 are in contact with an electrolyte, such as the fuel in gap 320. Conducting ions from sacrificial anode 240 rather than cylinder head 110 may substantially reduce galvanic corrosion of the seat pocket of cylinder head 110. Sacrificial anode 240 may be constructed of a material less noble than the material forming cylinder head 110 as determined by a galvanic series for the electrolytic fuel. For example, when the electrolyte is ethanol and cylinder head 110 is constructed of aluminum or an aluminum alloy, sacrificial anode 240 may include zinc or magnesium.

At 1530, fuel may be evaporated from between valve seat insert 152 and cylinder head 110. The air flow, and thus, the rate of evaporation, may be increased by adding channels between valve seat insert 152 and cylinder head 110. Channels may extend radially from inner surface 220 to outer surface 210 and/or channels may follow a circular path, such as outer radial slot 1250. When the electrolytic fuel is evaporated from between valve seat insert 152 and cylinder head 110, the galvanic reaction may be stopped and galvanic corrosion may be substantially reduced.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, gasoline, diesel and other engine types and fuel types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A valve seat insert for a cylinder head seat pocket of an internal combustion engine, the valve seat insert comprising:
an annular body comprising a first material and including an inner surface, an outer surface opposite the inner surface, a front surface adjoining the inner surface and the outer surface, and a back surface opposite the front surface adjoining the inner surface and the outer surface, the front surface including an inner circumference greater than an inner circumference of the back surface, the back surface including a first recession; and
a sacrificial anode comprising a second material different from the first material and including an exposed surface, the sacrificial anode inlaid in the first recession of the back surface of the annular body such that each surface of the sacrificial anode other than the exposed surface is in contact with the annular body.

2. The valve seat insert of claim 1, wherein the sacrificial anode completely fills the first recession such that the exposed surface of the sacrificial anode and the back surface of the annular body are flush.

3. The valve seat insert of claim 2, wherein a surface area of the back surface of the annular body is greater than a surface area of the exposed surface of the sacrificial anode.

4. The valve seat insert of claim 1, wherein the first recession comprises a circular groove including a width and a depth, the depth being less than twice the width.

5. The valve seat insert of claim 1, wherein the first recession comprises a plurality of radial grooves, each radial groove includes a width, the back surface includes a width, and the width of each groove is less than twice the width of the back surface.

6. The valve seat insert of claim 1, wherein the back surface further comprises a second recession.

7. The valve seat insert of claim 6, wherein the second recession comprises a plurality of radial grooves.

8. The valve seat insert of claim 6, wherein the second recession comprises a circular groove.

9. The valve seat insert of claim 1, wherein the second material includes a metal from a group including zinc or magnesium.

10. The valve seat insert of claim 1, wherein the first material is more noble than the second material in a galvanic series for ethanol, and wherein the sacrificial anode is sintered to the annular body.

11. The valve seat insert of claim 2, wherein the inner surface includes a first face, a second face, and a third face, the first face adjoining the back surface and the second face, the first face parallel to the outer surface and perpendicular to the back surface, the second face adjoining the first face and the third face, the third face adjoining the front surface and the second face, the front surface being parallel to the back surface.

12. The valve seat insert of claim 11, wherein the outer surface includes a height, the first recession includes a height less than one sixth of the height of the outer surface, the back surface includes a width between one third and one half of the height of the outer surface, the front surface includes a width between one fourth and one sixth of the height of the outer surface, the first face of the inner surface includes a height between one third and two thirds of the height of the outer surface, the second face of the inner surface includes a width between one fourth and one sixth of the height of the outer surface, the third face of the inner surface includes a width between one fourth and one sixth of the height of the outer surface.

13. A cylinder head of an internal combustion engine, the cylinder head comprising:
a seat pocket having a back;
a valve seat insert fitted into the seat pocket, the valve seat insert comprising:
a body comprising a first material and including a first surface, the first surface including a first recession, the first surface facing the back of the seat pocket;
a sacrificial anode comprising a second material and including a second surface in electrical contact with fuel when the internal combustion engine is operating, the sacrificial anode inlaid in the first recession of the first surface of the body, the second surface flush with the first surface, the second surface facing the back of the seat pocket, the second material being less noble than aluminum in a galvanic series for ethanol.

14. The valve seat insert of claim 13, wherein the first recession comprises a circular groove including a first width and a depth, the depth being less than twice the first width, and wherein the first surface has a second width that is greater than or equal to three times the first width.

15. The valve seat insert of claim 13, wherein the first recession comprises a plurality of radial grooves, each radial groove includes a width, the first surface includes a width, and the width of each groove is less than twice the width of the first surface.

16. The valve seat insert of claim 13, wherein the first surface of the body includes a second recession.

17. The valve seat insert of claim 16, wherein the second recession includes one or more of a circular groove and a plurality of radial grooves.

18. The valve seat insert of claim 13, wherein a surface area of the first surface is greater than a surface area of the second surface.

19. A method for delivering fuel in an engine, the engine including a cylinder head, the method comprising:
inducting injected electrically conductive fuel past a valve seat insert into a seat pocket of the cylinder head, the valve seat insert including a sacrificial anode inlaid in a recession of the valve seat insert; and
conducting ions from the sacrificial anode via a galvanic reaction.

20. The method of claim 19, further comprising:
evaporating fuel from between the valve seat insert and the cylinder head, the sacrificial anode including an exposed surface in electrical contact with the electrically conductive fuel when the electrically conductive fuel is inducted past the valve seat insert, the exposed surface of the sacrificial anode greater than or equal to a surface area of the valve seat insert.

* * * * *